March 12, 1968 P. F. LAMBERT 3,373,295

MEMORY ELEMENT

Filed April 27, 1965 2 Sheets-Sheet 1

INVENTOR.
PETER F. LAMBERT

BY Edward O. Ansell
George J. Netter

ATTORNEYS

INVENTOR.
PETER F. LAMBERT
BY Edward O. Ansell
George J. Netter
ATTORNEYS

United States Patent Office 3,373,295
Patented Mar. 12, 1968

3,373,295
MEMORY ELEMENT

Peter F. Lambert, New Haven, Conn., assignor to Aerojet-General Corporation, El Monte, Calif., a corporation of Ohio Filed Apr. 27, 1965, Ser. No. 451,123
5 Claims. (Cl. 307—238)

ABSTRACT OF THE DISCLOSURE

This invention relates to memory elements, and more particularly, to memory elements having variable gain characteristics in addition to relatively long term electrical storage capabilities.

A memory element according to the present invention comprises a field-modifiable variable resistor, for example, a field-effect transistor having a gate terminal, a drain terminal and a source terminal. Means is provided for applying adaptation or information signals to the gate terminal. Storage means is electrically related to the gate terminal of the transistor for storing the adaption signals. A source of signals to be adapted is electrically related to the drain and source terminals to produce a current between the drain and source termials. The information or adaption signals stored in the storage means maintains the transistor in a reverse-biased condition, thereby substantially preventing flow of adaption signal current through the transistor. To effect a read-out, the adaption signal stored in the storage device produces an electric field in the transistor, thereby providing a flow of drain-source current. Thus, the output voltage measured across the transistor is functionally related to the charge on the storage device. Furthermore, increasing or decreasing the stored adaption signal produces a corresponding change in the electric field, thereby providing a resultant modulation of the drain-source current.

According to one modification of the invention, a dual-gate-field-effect transistor is provided so that one gate receives a supply of adaption electric signals while the other gate receives a supply of electrical signals to be adapted. A fixed bias is electrically connected to both the drain and source terminals.

The present invention relates generally to a memory element, and, more particularly, to such an element having variable gain characteristics in addition to a relatively long-term electric signal storage capability.

In many electrical control operations, computing or communication applications it is frequently necessary to be able to store into a device, or memory, a prescribed quantity of electric signal and retain this signal in an unimpaired condition for relatively long periods of time. Illustrative of such apparatus would be an analog-to-digital converter, for example, where it is important that the exact amount of an analog voltage be stored and read out at a later time in substantially identical undiminished form for digitizing.

Another and more recent class of equipment utilizing potential storage as a basic function are so-called adaptive or learning machines. Such equipment not only stores a large quantity of analog signals having a coded relation to some physical characteristic or predetermined imposed logical condition, but also the stored signals can be selectively modified to be read out as new signals having other coded meanings. Accordingly, a satisfactory adaptive memory element can perform two basic functions: store an electric signal for a substantial period of time without significant deterioration or change; and provide read-out with selectively variable and known gain. More particularly as to the latter feature, it is usually considered desirable that an adaptive memory element be capable of providing a smoothly variable and reversible gain that is proportional to the time integral or analog of a preselected control or adaption signal.

Other characteristics or attributes to be found in an ideal adaptive memory element are: a considerable range of operation, both as to frequency and magnitude of adaption signals; ability to accommodate signals representing both positive and negative adaptions or conditioning; response time to impressed adaption signals is very short; gain is maintained substantially constant when the element is not being conditioned or undergoing adaption; and the impedance levels and signal handling characteristics at adapt and sense terminals (input and output) are compatible permitting interconnection into networks.

Potential memory devices for use in analog applications have commonly employed heretofore a signal capacitance as a storage means and attempted to minimize leakage by some means or other. In systems using such a storage techniques the period of effective undeteriorated storage is generally of the order of a few milliseconds. Also, despite the availability of a variety of different devices that are generally acceptable to serve in the special function of an adaptive memory, such as the so-called memistor, silver sulphide components, or tape-wound magnetic core pairs, each of these is not completely satisfactory, for one reason or another.

It is therefore a primary and first object of the invention to provide a signal storage element having relatively long-term storage capabilities without significant error.

A further object is the provision of such an element having variable gain.

A still further object is the provision of an element set forth in the above objects of respectively compatible input and output impedance for cascade arrangement into adaptive networks.

Yet another object is the provision of a memory element amenable to fabrication by thin-film techniques.

Another object is the provision of an adaptive storage element having a wide functioning range both as to frequency and magnitude of adaption signals.

These and other objects of the invention will become apparent in view of the following specification and accompanying drawings.

As described here, the invention utilizes in each embodiment as a basic active element, a so-called field-effect transistor. Although any device having a load current that can be modulated by means of an impressed electric field could be used to practice the present invention, the device presently known that is most ideally suited in this respect is the field-effect transistor.

Figures 1, 2:
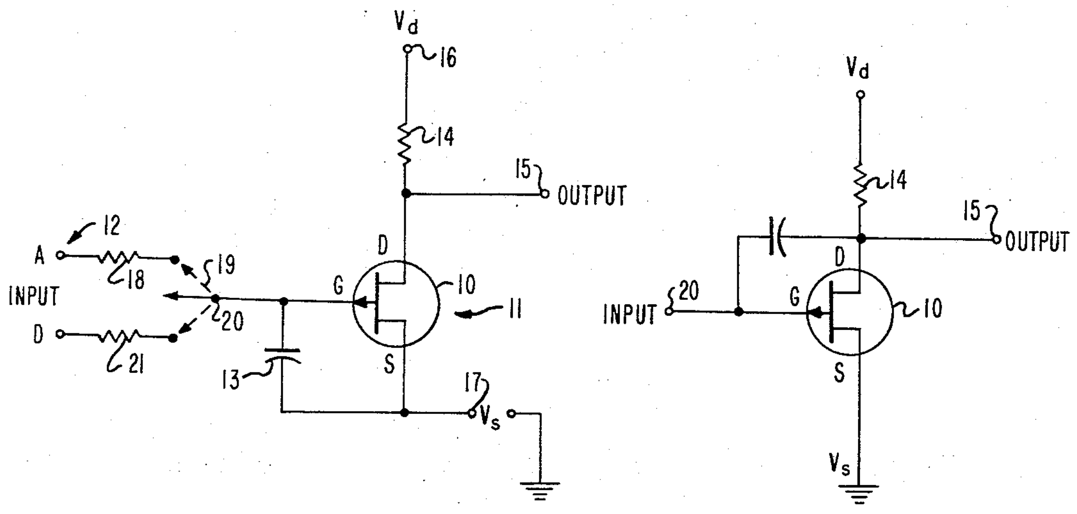
FIGURE 1 illustrates a first form of the memory circuit element of the invention.
FIGURES 2–4 show alternate circuital configurations of the invention.

In its most general aspect, the field-effect transistor, shown as 10 in FIGURE 1, is a three-terminal solid state device. The designations for these terminals are as follows: gate terminal, G; drain terminal, D; and source terminal, S. Briefly, with a given potential difference set up across the drain and source, $V_{ds}$, the magnitude of the drain or channel current, $I_d$, is under the control of the potential existing across the gate and source, $V_{gs}$.

Figure 6:
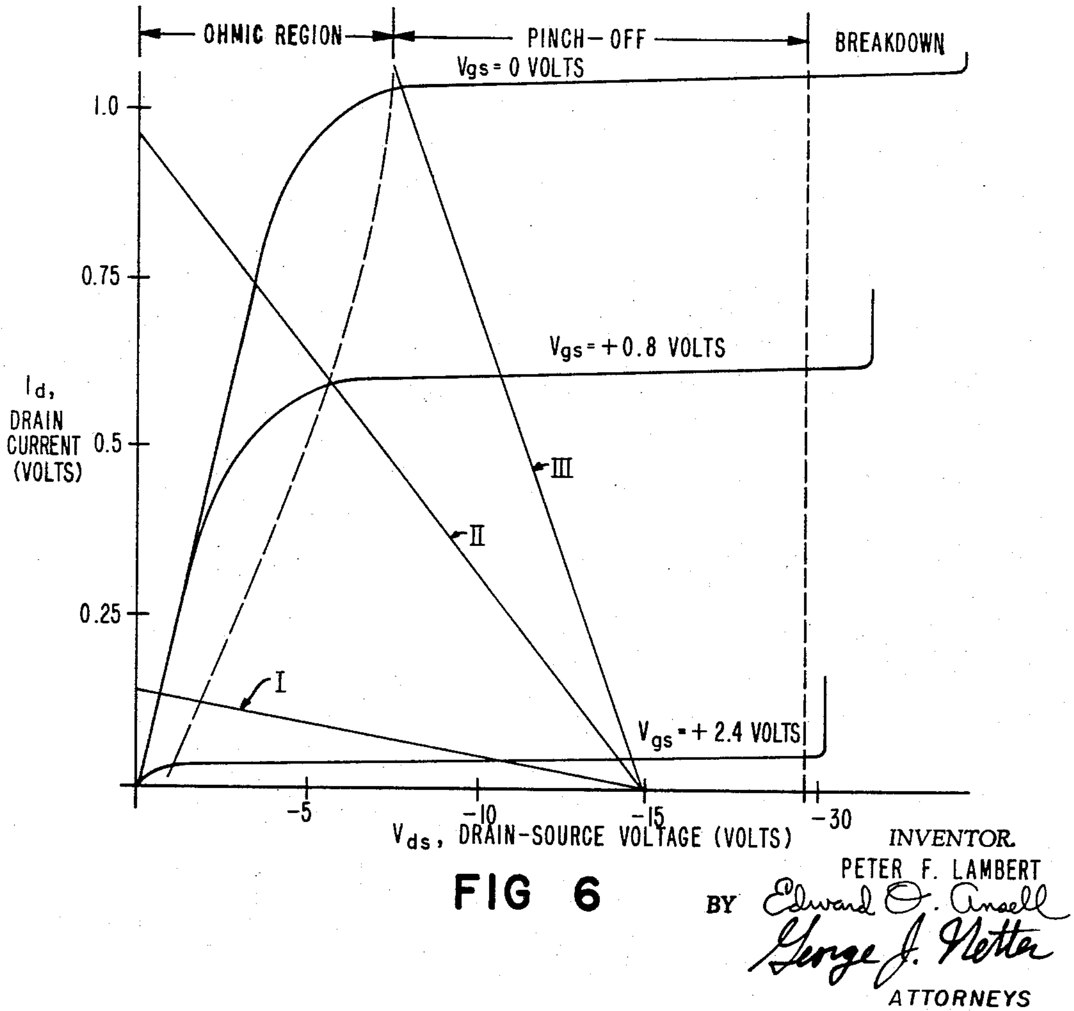
FIGURE 6 is a graph of certain other characteristics and D.C. load lines of the special active element.

With reference now to the operating characteristic curve of FIGURE 6, it is seen that up to the area indicated as "pinch-off" the device has properties highly similar to a voltage variable resistor with control effected by the gate-source voltage. This lower operating range is appropriately termed the ohmic region. Above pinch-off, on exceeding a certain value of reverse bias, avalanche breakdown occurs and the drain-to-gate current increases very rapidly. This reverse bias requirement of the gate is unique to the unipolar field-effect transistor as distinct from the so-called insulated-gate thin-film transistor, and it will be assumed in the descriptive matter to follow that the unipolar device is meant unless specifically indicated otherwise.

Figure 5:
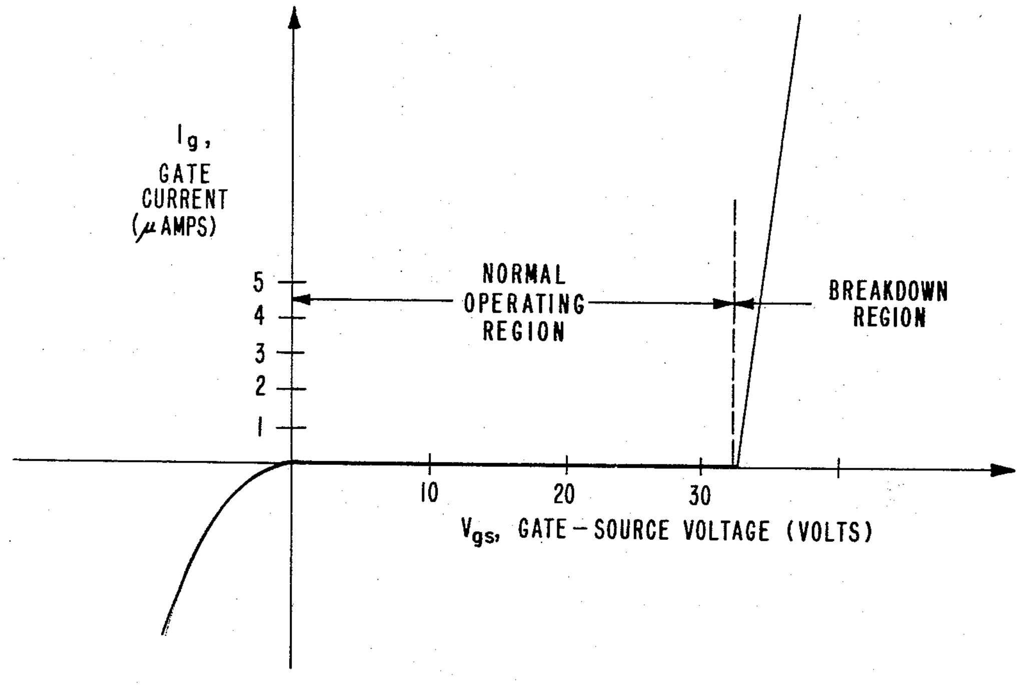
FIGURE 5 is a graphical representation of certain operating characteristics of a special active element for use in the various forms of the invention shown in FIGURES 1–4.

In FIGURE 5 there is shown a graphical representation of the gate-source voltage versus gate current characteristic. It will be noted that for normal operation it is desirable that the gate current, $I_g$, be maintained at substantially zero. Actually, it is perhaps more correct to state this in the converse, that is, when appreciably gate current appears the normal operating range (for present purposes) has been exceeded. As long as the device is operated in the normal operating region the input impedance at the gate terminal is very high—$10^9$–$10^{10}$ ohms. This latter fact is advantageous to the described memory for reasons that will be more definitely set forth later.

Returning now to FIGURE 1 and a first embodiment of the invention, the adaptive memory element indicated generally at 11 includes a field effect transistor 10, an input circuit 12, a storage capacitor 13, load resistor 14 and an output terminal 15. Terminals 16 and 17 are also supplied for making appropriate connection to voltage sources (not shown). Specifiically, a negative voltage supply is connected to 16, and terminal 17 can be the common or ground terminal. The set of polarities adopted here are applicable for use with an N-channel field-effect device, although by an appropriate choice of polarities a P-channel device can be used, with equally good results.

An adaption or information signal, A, of positive polarity is communicated via an appropriately weighted resistor 18 and switching means 19 to the adaption terminal 20. This connection is maintained for some predetermined time increment T1 in order to enable charging of the capacitor 13 in accordance with a preselected analog relation of the adaption or control signal. The terms "adaption," "information" and "control," when describing a signal, current or voltage, are used interchangeably herein and refer to the charging signal for charging or discharging the storage capacitor. The term "analog," as used in connection with the relationship of increasing and decreasing control voltages stored in the storage capacitor, means that the relationship of the voltage stored in such capacitor is proportional to the time interval that the control voltage is permitted to charge or discharge said capacitor. After "training" or adaption, the switching means 19 is set to the neutral or middle position, that is, electrically isolated from all input signals. This latent period, or time of storage of the adaption signal, can exist for a considerable length of time. Thus, with proper choice of operating voltages and a capacitor 13 of the order of 10 microfarads, memory time constants of 100 hours are attainable.

Discharge or negative adaption of the memory element is accomplished by transferring the switching means 19 to the lowermost position effecting electrical connection between the discharge voltage D via a properly weighted resistor 21 to the adaption terminal 20. D can be either a signal of negative polarity or system ground in order to accomplish the function of decreasing the charge previously stored in the capacitor.

Charging and discharging of the capacitor in the manner described effects a corresponding change in electric field of the device 10 thereby providing a resultant modulation of the adapted signal, that is, the drain-source current, $I_d$. Also, voltage measured across the terminal 15 and source terminal 17, corresponding to the OUTPUT, similarly experiences a variation functionally related to charging or discharging of the capacitor. Since a high degree of electrical isolation of the gate, G, is provided by reverse biasing the field-effect transistor, the reverse transconductance from drain to gate is low. Accordingly, loading of the drain circuit is of negligible effect on storage of charge in the capacitor 13. For present purposes, this means that the capacitor can be charged and discharged many times with the magnitudes of charge involved being different each time, and on setting the switching means 19 to the neutral or latent condition the cumulative charge state of the capacitor will remain substantially constant at its final cumulative value. Moreover, since repeated measurements of the adapted signal OUTPUT can be taken by relatively low impedance apparatus without disturbing the cumulative charge state of the capacitor, the described memory element has the very desirable capability of non-destructive readout (NDRO).

It will be appreciated that since the charging and discharging rates of a capacitor in a series R–C circuit are exponential functions, charging and discharging rates in different operation cycles may be different. Although in an adaptive memory element as set forth here it is neither necessary nor critical that adaption rates be linear, such linearity is desirable in the interests of providing true load sharing in a network of such memory elements. Otherwise, if nonlinearity were the rule some memory elements would respond more quickly than others to a given set of training or adaption signals (depending upon the portion of the characteristic curve in which they are operating) and this would mean a greater dependence of the final composite result, or training pattern, upon the more "responsive" elements.

It can be shown that in order to keep the charging and discharging rates constant to within one part in K, where K is constant, that the following mathematical relationships must be maintained:

$$A \geq KV_{gs}| \text{ max.}$$

$$-D \geq KV_{gs}| \text{ max.}$$

Applying this to the previously described circuit using a commercially available field-effect transistor that can effect maximum drain-source conductance with up to 2 volts for $V_{gs}$, non-linearities of less than 10% can be achieved for $A=20$ v. D.C. and $D=-20$ v. D.C.

It is basic that the time constant for a capacitor (RC, where R is the leakage resistance of the capacitor) is determined to a great extent by the component materials. For example, electrolytic capacitors are not well suited for use here since although they can be made with large values of capacitance, the time constants are short because of the inherently low leakage resistance. Electrostatic capacitors, on the other hand, have a high leakage resistance, but are relatively large as compared to electrolytic units of similar capacitance. Probably the capacitor offering the best compromise between size and time constant available at present would be one using a polystyrene dielectric. Capacitors of this type have been found to have resistance-capacitance products of approximately $10^{13}$ ohm-microfarads, or $10^7$ seconds.

The already described first embodiment of the invention can accommodate either D.C. or A.C. adaption. Thus, the voltage $V_d$ producing the drain-source current $I_d$ that is determinative of the OUTPUT, can be either a fixed or slowly varying D.C. voltage or an A.C. voltage. The slant lines I, II and III of FIGURE 6 represent three D.C. load lines, illustrative of three different operating conditions.

With respect to A.C. adaption, it is necessary to provide a D.C. bias on $V_d$ of sufficient amount to prevent the negative polarity swings of the A.C. signal from forward biasing the field-effect transistor and thereby effecting discharge of the stored information in the capacitor.

An alternate circuit arrangement is that illustrated in FIGURE 2 where the storage capacitor is connected across the gate and drain of the field-effect transistor, rather than in the gate-source connection of FIGURE 1. Otherwise, all circuital relations (and reference numerals) are the same as in FIGURE 1. In cases where the transistor or the switching means 19 are the limiting items in the memory circuit (and not the capacitor), extended storage time is provided by this circuit configuration. This is a result of the fact that there is in effect a multiplication of the capacitance of the capacitor by a factor equal to the voltage gain of the field-effect transistor. As a consequence a smaller valued capacitor can be used in this type of circuit thereby reducing overall size requirements.

Figure 3:
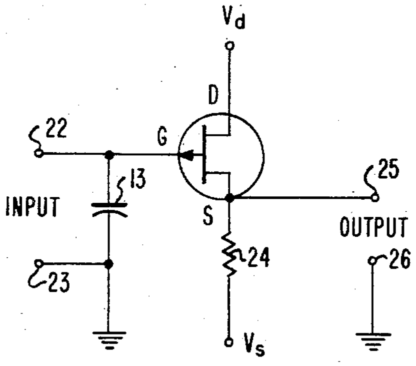

What might be termed a source-follower arrangement is that shown in FIGURE 3. The storage capacitor 13 interconnects the gate of the transistor and system ground with input or adaption signals applied across the capacitor via terminals 22 and 23. The drain is connected directly to a voltage $V_d$ and the source is similarly related to a voltage $V_s$ through series resistor 24. Output is taken across the source and ground at terminals 25 and 26. This configuration is important in that it offers an extended linearity of operation, and output signals of both polarities are obtainable, while maintaining the common system ground. This circuit also possesses low D.C. drift resulting from variations in temperature, which is also advantageous.

Figure 4:
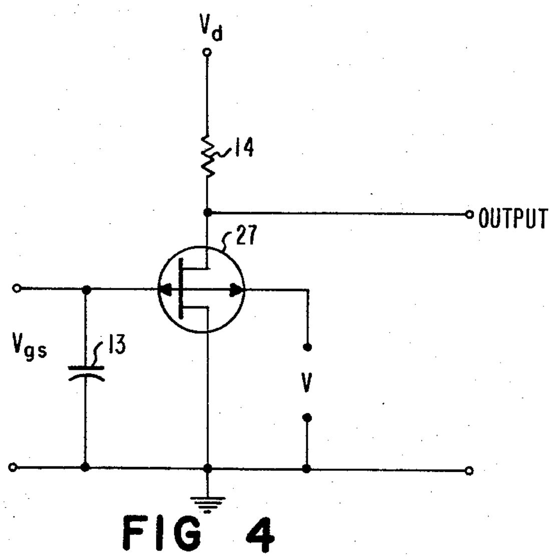

FIGURE 4 shows another form of the invention which differs from that of FIGURE 1 in two respects, namely, the basic active device 27 is what is called a dual gate field-effect transistor and the signal to be adapted, V, is fed into the circuit across the second gate and ground. The drain voltage $V_d$ is usually a fixed bias which makes this configuration especially suitable where V is an analog or A.C. signal. The voltage to be adapted, V, is applied to field-effect transistor 27 across the second gate and the source terminals. This voltage generates an electric field in the field-effect transistor, which electric field is modified by the voltage appearing at the first gate. The adaption signal, $V_{gs}$, is stored in capacitor 13 in the same manner as the adaption signal was stored in the other modifications of this invention. Thus, the adaption signal, $V_{gs}$, and the adapted signal, V, cooperate to modify the electric field in the transistor, and thus the resistance between the drain and source terminals is modified so as to modify the flow of current provided by the bias voltage between the drain and source terminals. The output of the device is taken across the drain and source terminals.

Although the invention has been described in connection with unipolar field-effect transistors, it is felt that circuits utilizing isolated-gate thin-film devices would be fully within the spirit and contemplation of the invention. An important and advantageous difference of this device over a unipolar one is that its gate is electrically isolated from the drain-source channel thereby permitting biasing of the gate to either polarity without producing significant gate current. It will be recalled in this regard that a unipolar device must be reverse biased or excessive gate current is drawn and the device is driven into breakdown. Of outstanding importance is the fact that isolated-gate transistors are thin-film devices that are amenable to large quantity production and relatively inexpensive on a unit standpoint. Also, size of each unit is considerably reduced over the discrete component unipolar transistors enabling commensurately large savings in size and weight for networks of adaptive memory elements.

Obviously many modifications and variations of the present invention are possible in the light of the above teachings. It is therefore to be understood that within the scope of the appended claims the invention may be practiced otherwise than as specifically described.

What is claimed is:

1. An adaptive memory circuit element comprising: a unipolar field-effect transistor having a gate terminal, a drain terminal and a source terminal; a source of electric current to be adapted connected to produce current flow between the drain and source terminals; a storage capacitor connected to the gate terminal of the field-effect transistor for storing a control voltage; and switching means connected to the storage capacitor, said switching means being adapted to connect said storage capacitor to a supply of control voltage including a first supply of voltage of a first polarity and a second supply of voltage of a second polarity opposite from the first polarity for selectively connecting the first and second supplies to the capacitor for selectively increasing and decreasing in analog relation the control voltage stored in said storage capacitor, the stored control voltage being of such polarity as to maintain the field-effect transistor in a reverse-biased condition thereby substantially preventing the flow of control signal current through the field-effect transistor, whereby adapted signal current flow between the drain and source terminals is functionally related to the control voltage stored in the storage capacitor.

2. An adaptive memory circuit element as in claim 1 in which the capacitor is connected between the gate and source terminals.

3. An adaptive memory circuit element as in claim 1 in which the capacitor is connected between the gate and drain terminals.

4. An adaptive memory circuit element as in claim 1, further comprising, means including a resistor forming an output between said source terminal and electrical ground whereby the voltage measurements taken therefrom provide a representation of the total charge stored in said capacitor and each measurement not influencing the quantity of charge so stored.

5. An adaptive memory circuit element comprising: a dual gate unipolar field-effect transistor having first gate, second gate, drain and source terminals; a storage capacitor connected to said first gate terminal; a first supply of voltage serially connected with the drain and source terminals; a supply of current to be adapted connected between the second gate terminal and the source terminal; output means connected to the drain terminal; and switching means connected to said capacitor, said switching means being adapted to connect said storage capacitor to a supply of control voltage for selectively increasing and decreasing in analog relation the control voltage stored in said capacitor; the relative magnitudes and polarities of the first supply of voltage, the current to be adapted and the stored control voltage being such that the transistor is maintained in a reverse-biased condition and does not draw appreciable control signal current through the first gate terminal, the signal current flow between the drain and source terminals being functionally related to the control voltage stored in said storage capacitor.

References Cited

UNITED STATES PATENTS

| | | | |
|---|---|---|---|
| 3,062,972 | 11/1962 | Spector et al. | 307—88.5 |
| 3,252,009 | 5/1966 | Weimer | 307—88.5 |
| 3,272,989 | 9/1966 | Sekely | 307—88.5 |

FOREIGN PATENTS

| | | |
|---|---|---|
| 950,183 | 2/1964 | Great Britain. |

ARTHUR GAUSS, *Primary Examiner.*

J. ZAZWORSKY, *Assistant Examiner.*